Aug. 10, 1937.  J. J. GLAUBER  2,089,647
TUBE ELEMENT SHOCK ABSORBER
Filed Oct. 12, 1933
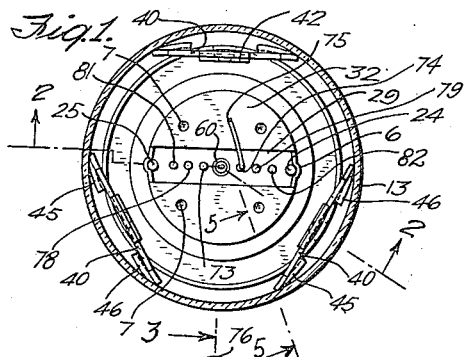
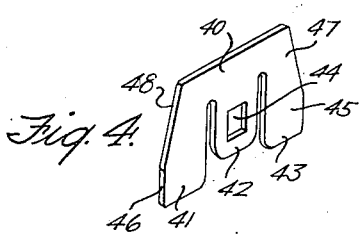
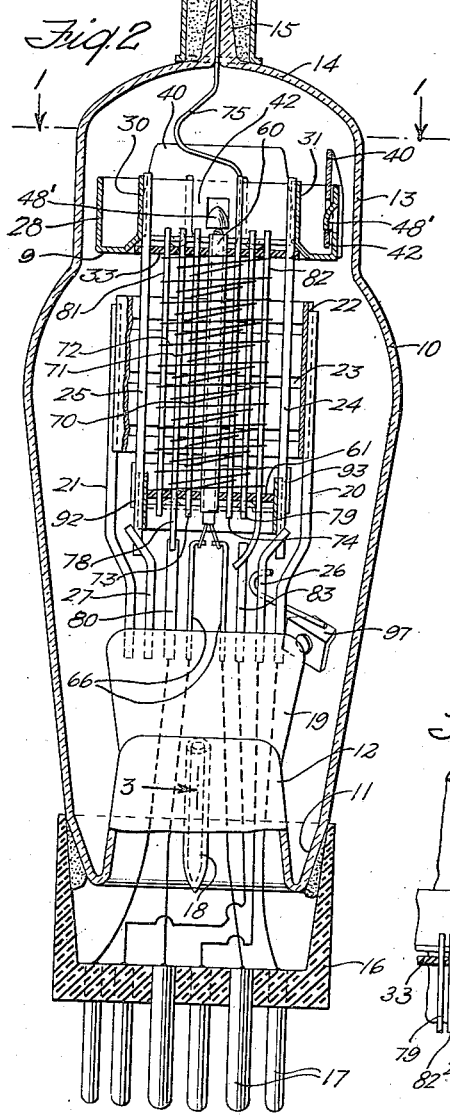
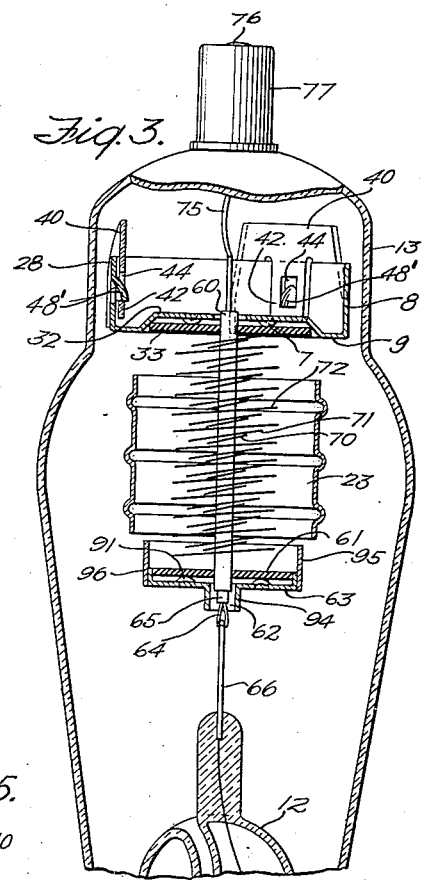
INVENTOR
JOHN J. GLAUBER
BY
Braselton Whitcomb & Davies
ATTORNEYS Patented Aug. 10, 1937

2,089,647

UNITED STATES PATENT OFFICE 2,089,647

TUBE ELEMENT SHOCK ABSORBER

John J. Glauber, Newark, N. J., assignor to Arcturus Development Company, Newark, N. J., a corporation of Delaware Application October 12, 1933, Serial No. 693,281

10 Claims. (Cl. 250—27.5)

This invention relates broadly to shock absorbing devices for use in connection with element assemblies adapted to be inserted within a closed container. More specifically the invention relates to improved means for retaining the unit assembly of elements of a radio tube in position and for absorbing shocks received by the envelope.

In many closed devices such as thermionic tubes, and particularly radio tubes, the various elements forming the tube mechanism are supported at one end of the tube in the stem and consequently in view of the more or less movable nature of the forming constituents of the assembly the relative position of the elements is subject to deformation because of shock imposed on the container. Various means have been suggested for resisting the impact of shock, but an important difficulty of many such devices is that the shock absorption is incomplete on the part of the shock absorber so that one or more of the composing elements of the assembly are displaced with reference to each other, thus affecting the electrical characteristics of the tube. Another outstanding difficulty with various shock absorbers has been the fact that they are necessarily of a certain fixed dimension so that when placed in tubes which are subject to considerable variation of dimension there is a wide variation in the effectiveness of contact between the shock absorber and the wall of the container. This results in imperfection in many of the tubes and consequently greatly increases the cost of production.

It is accordingly one of the objects of the present invention to provide a shock absorber for use in conjunction particularly with radio tubes which thoroughly and efficiently absorbs the shocks received by the container without disturbing the relative position of the elements contained within.

Still another object of the invention is to provide a shock absorber which is automatically adjustable to variable diameters of the containing tubes.

A further object of the invention is to provide a shock absorber which is a poor conductor of heat and consequently which minimizes the effect of heat in the elements on the walls of the container, thereby avoiding distortion to the element and injury to the envelope.

Still another object of the invention is to provide an assembly of shock absorbers for the element assembly of a radio tube which are so distributed as to provide a maximum of resistance of shock transmitted from the envelope towards the elements of the tube.

An object also is to provide shock absorbers which are not easily displaced in the operation of tube assembly.

Broadly stated, the object of the invention is to provide means for resisting deformation in the element assembly of a radio tube whether arising from shock, movement, or heat.

Further objects of the invention will appear from consideration of the following description and the accompanying drawing, in which:

Fig. 1 is a plan view of the shock absorbing unit along the lines 1—1 of Fig. 2;

Fig. 2 is a sectional elevation of the tube with the shock absorber and heat absorbing element in position and along lines 2—2 of Fig. 1;

Fig. 3 is a side sectional elevational view of the tube as shown in Fig. 2;

Fig. 4 is a perspective view of the shock absorbing element; and

Fig. 5 is a detail showing the shock absorber element in position within the tube.

Referring to the drawing, in Fig. 2 particularly there is illustrated a tube container 10 adapted to be used in conjunction with a multi-element thermionic radio tube having a tapered base portion 11 and a re-entrant stem 12 adapted to hold the various elements within the tube. The top portion of the tube 10 is extended in a cylindrical portion 13, terminating in a spherical top 14 having an external tip 15. The base of the tube at the tapered portion 11 is secured by means of cement to the base plug 16 in which are positioned the various terminal contacts 17.

The stem 12 is provided with the sealed stem tube 18 and the press 19 forms an extension of the stem 12 and in which are sealed the various standards and supports for the elements of the tube. Two main standards 20 and 21 are formed on either edge of the press and extend upwardly within the tube to sustain the anode shell 22 which is in the form of a cylindrical band of metal carrying ribs 23, as illustrated, and is welded to the standards 20 and 21 respectively.

Within the anode tube are the two vertical rods 24 and 25 which extend downwardly to make contact with the supporting standards 26 and 27 respectively, and on their upper ends extend to make contact with the shock absorber shell 28 positioned within the cylindrical portion 13 of the tube, the standards lying in internally opening and vertical grooves 6 formed in the shell wall.

The shell 28 is a cup-shaped member having a slot 29, as illustrated clearly in Fig. 1, struck out of the base thereof, the metal of the struck out portion being bent inwardly of the cup to form contact members 30 and 31 with the standards 24 and 25 to which they are welded. The base 9 of the cup 28 is also stamped inwardly to form a raised circular area 32 which is adapted for reception of a circular mica disc 33. Protuberances 7 in the base 9 separate the disc 33 from the base. The edge of the shock absorbing support 28 is a continuous flange 8 about the base of the cup and the upper free edge of the same is adapted to receive one or more of the shock absorber elements, the preferred number being three, which by virtue of the balancing of pressures secures the maximum of shock absorption when the envelope is subjected to shock.

The shock absorber element as illustrated in perspective in Fig. 4 is a sheet of mica having a base portion 40 and projecting tongues 41, 42, and 43, the tongues 41 and 43 being at either end of the plate, while the tongue 42 being intermediate the other tongues and of shorter length. The tongue 42 is also provided with an aperture 44 shown square in formation which is adapted to retain the element in place on the support, as will be hereinafter more fully described.

Particular attention is directed to the fact that the end edges of the absorber element do not form complete rectangles, but that while the outer corners of tongues 41 and 43 are rectangular, the corners of the base are not rectangular, the end thus being formed of the parallel side edges 45 and 46 and the converging side edges 47 and 48.

The flange 8 of the shock absorber support 28 is provided with struck-out portions at such parts on its periphery at which the shock absorbers are to be attached. These portions 48' are adapted to be positioned within the square aperture 44 of the central tongue 42 of the shock absorber element, as clearly illustrated in Fig. 3, and thereby retains the shock absorber element in position and prevents movement thereof under conditions which will be described hereinbelow. When positioned in the tube the shock absorber elements are adapted to yieldably and resiliently contact against the cylindrical wall 13 thereof at the edges 45 and 46, the edges 47 and 48 being free from and out of contact with the tube wall. This is of considerable importance, inasmuch as the base plate 9 of the support element 28 lies in the plane at right angles to the axis of the tube and consequently is adapted to resist radial pressure, whereas the flange 8 of the supporter 28 is coaxial to the cylindrical wall 13 and when pressure is placed upon this flange 8 the wall of the cup 28 is deformed and consequently the relative position of the elements is modified and the electrical characteristics of the tube disturbed. By virtue of the fact that the contact of the shock absorber elements is made on the edges 45 and 46 the pressure due to the resilient contacts of this plate with the wall of the tube is transmitted only along the plane of greatest resistance, that is, along the base 9 of the support 28.

The cathode of the tube consists of a cylindrical element 60, the upper end of which passes through the plate 33 and the slot 29, as illustrated in Fig. 1 of the drawing, and the lower end of which passes through a second insulation plate of mica 61 and through a slot 62 of a supporting disc 63, and is there frictionally retained by the mica discs 33 and 61. Within the cathode is the filament 64 which is of the hairpin type, as illustrated, and which may be insulated from the cathode by any appropriate means, as for example, by the insulated sleeve 65. The ends of the heater filament extend below the cathode and make contact with the connectors 66 sealed in the press 19.

A triple grid structure is shown in the tube as illustrated, including the grid 70 about the cathode, the grid 72 which is next to the anode, and the intermediate grid 71. The supports of these grids are rods passing through the mica plates 33 and 61, the supports for the grid 70 consisting of the two rods 73 and 74. The rod 74 at its upper end is continued to the top of the shock absorber support 28 where attachment is made to a flexible connector 75 which passes through the tip 15 at the top of the spherical portion 14 of the tube to form an external contact 76 on the conducting cylindrical cap 77 cemented to the tip 15. The grid 71 is supported by the two rods 78 and 79, the rod 78 extending below the cathode to make contact with the connector 80 which in turn is sealed in the press 19. The grid 72 is in turn mounted on the two rods 81 and 82, the rod 82 extending below the base of the cathode and being electrically connected to the connector 83 which is sealed in the press 19. Connectors 80, 83, 26 and 20 are all provided with flexible connectors which make connection to the appropriate terminal contact 17 on the base of the tube.

In order to support the mica plate 61 at the bottom of the element, which in turn maintains the position of the various connecting rods of the grid and the cathode, the circular plate member 63 is provided, in the base of which are small protuberances 91 which serve to maintain the plate 61 away from close contact with the plate 63 and thereby prevent the transmission of heat from the plate 63 to the mica insulator 61 to such an extent as to bring about decomposition of the mica and thus failure of the tube.

The plate 63 has an upturned flange 92 which is formed with diametrically opposed outwardly opening axial grooves 92 and 93 which are adapted to make contact with the support rods 24 and 25 and be welded thereto. It is pointed out that the slot 62 formed across the base of the plate 63 permits the striking out of metal at the end of the slot which form extensions to the contact surfaces 92 and 93 and thereby increase the holding effect at these points. The lateral edges 94 of the slot 62 extend downwardly as shown in Fig. 3, serving to shield the lower ends of the grid rods 73 and 74 from points external thereto. Through this slot 62 the ends of the various rods supporting the grids and also the lower ends of the cathode protrude, so that it is unnecessary to dimension the rod length closely, and also so that such of the rods as are to be made part of the electrical circuit may extend downwardly and be brought into contact with the proper conducting connectors. Strips 95 and 96, each passing half of the circumference of the flange 92, are welded to this flange so that the shielding effect of the lower cup-shaped member may be magnified and the efficiency of the tube may be increased. This shielding effect may also be magnified by a deeply drawn cup whose cross-section would be similar to that shown in Fig. 3.

The support for the usual gas getter capsule is indicated at 97 which in turn is secured to the connector 26.

The purpose of the interlocking means between the shock absorbing element and the support flange indicated by the aperture 44 and projection 48' may now be explained. In the assembly of the bulb and the stem the stem is welded to the base of the bulb and an excess of glass forms at the seal; and in order to thin this glass for the purpose of preventing breakage when the glass is cool, it is the usual practice to pull down on the stem 12 by means of the stem tube 18 to some extent, which causes a thinning action. However, if prior to this operation the elements have been inserted in place within the tube with the shock absorbing edges 45 and 46 in elastic contact with the sides of the cylindrical portion 13 of the tube, when the stem is pulled downwardly in the operation above mentioned, the shock absorbers, because of their frictional hold on the interior wall of the cylinder 13, will tend to slip off of the support 28. Should this occur, as frequently happens where no positive means of attachment is formed between the absorber and the supports, the shock absorption is useless and the tube is subject to injury and to loss of function.

While the shock absorber element 40 is shown and described as having the central tongue 42 of lesser length than the side tongues 41 and 43, the actual and relative tongue length is chiefly a matter of design and may be modified to fit the special requirements of the adjacent parts.

Modifications of the invention may of course be made, and therefore I do not desire to limit myself to the specific embodiment shown and described except insofar as such limitation is enforced by the claims hereto appended.

I desire to claim as my invention:

1. A thermionic tube comprising an envelope, a press within said envelope at one end thereof and formed integral therewith, a support member mounted on said press having a main portion lying in a plane transverse to the axis of said tube and a subsidiary portion formed as an axially extending flange on said main portion, a plurality of resilient members mounted on the flange periphery of said support member and making resilient contact with said member and the interior wall of said tube, said resilient members contacting with the wall of the tube approximately in the plane of the main portion of the support member, and means for positively holding said resilient member to the flange of the support member.

2. A device of the class described comprising an envelope, a base member within said envelope, operating elements mounted on said base, a flat support member having an axially extending flange wall thereon mounted in connection with said element and adjacent the wall of said envelope, a resilient plate having three tongues extending from one edge thereof, the middle tongue extending over the interior side of the flange wall of said support member and the two outer tongues extending on the outside of the wall of said member, whereby the resilient member is yieldingly held to the support member, the outer edges of said outside positioned tongues contacting with the wall of the envelope at points adjacent to the transverse portion of said support member, and means for positively holding said resilient member to the support member.

3. A thermionic device comprising an envelope having a rounded portion and an upper tubular portion, a press within said envelope and integral with the lower end thereof, an electrode assembly within said envelope, means to mount the lower end of said electrode assembly upon said press, a tubular member attached to the upper end of said element assembly and lying within said tubular portion of the envelope, a plurality of mica plates secured to said tubular member and resiliently engaging the inner wall of said tubular portion of said envelope, and means for positively retaining said mica plates upon the tubular member.

4. A thermionic device comprising an envelope having a rounded portion and an upper cylindrical portion, a press within said envelope and formed integral with the lower end thereof, an electrode assembly within said envelope, means to mount said electrode assembly upon said press, a cylindrical member attached to the upper end of said assembly, and a plurality of removable mica plates having resilient tongues to fit over the edge of said cylindrical member and having ends extending outwardly and contacting with the inner wall of the cylindrical portion of said envelope to hold said element structure in position, said mica plates being held in position upon said cylindrical member by their own resiliency, and additional means for positively retaining said mica plate upon said cylindrical member.

5. A shock absorber for an electrode element of a thermionic tube comprising a support member lying in a plane parallel to the axis of the element and rigidly connected to said element, and a plate of resilient material having a plurality of parallel slots extending partially across said plate from one edge thereof forming tongues adapted to engage said support member, and positive means for connecting the resilient plate to said support member.

6. A shock absorber for the elements of a thermionic device comprising a mica plate having three tongues formed thereon, two of said tongues having narrower bases than ends.

7. A shock absorber for the elements of a thermionic device comprising a mica plate having three tongues formed thereon, two of said tongues having narrower bases than ends, and an aperture formed within the middle tongue.

8. An electron discharge device having an envelope provided with a tubular portion, a mount comprising an electrode assembly positioned within said envelope, a member on said assembly having a collar-like portion extending within the tubular portion of said envelope coaxially therewith, and insulating sheet springs fastened to said collar-like portion and engaging the interior wall of the tubular portion of said envelope to resiliently and firmly position said mount in said envelope.

9. In combination, an envelope containing an electrode, and means for spacing said electrode from the wall of said envelope comprising a strip of resilient insulating material interlocked with said electrode and having a portion disposed between said electrode and said wall.

10. In combination, an envelope containing a substantially cylindrical electrode, a plurality of mica strips mounted on said electrode with their planes substantially parallel to the axis of said electrode, and means on each strip for locking it to said electrode.

JOHN J. GLAUBER.